Figure 1:
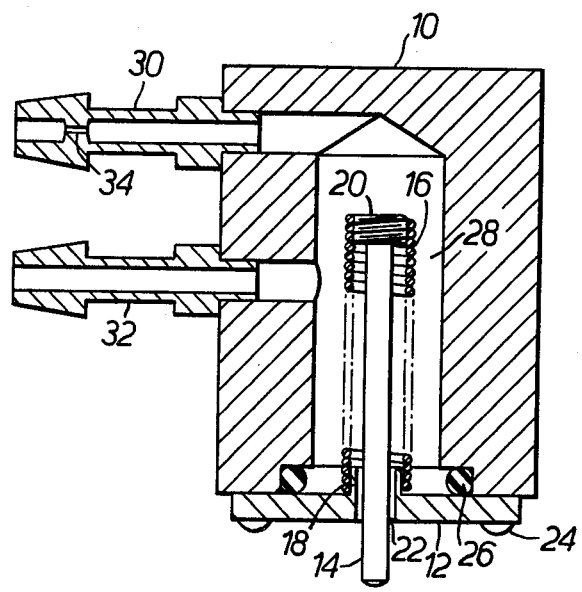

United States Patent [19]
Hayward et al.

[11] 4,204,553
[45] May 27, 1980

[54] VALVES

[75] Inventors: Terence J. Hayward, Thirsk; Alan H. T. Berrecloth, Yarm, both of England

[73] Assignee: HNL Instruments & Controls Limited, Cleveland, England

[21] Appl. No.: 915,571

[22] Filed: Jun. 14, 1978

[30] Foreign Application Priority Data

Jun. 16, 1977 [GB] United Kingdom ............. 25256/77

[51] Int. Cl.² .......................................... G05D 16/00
[52] U.S. Cl. ................................ 137/82; 251/DIG. 3
[58] Field of Search ............................ 137/82, 84, 85; 251/DIG. 3

[56] References Cited
U.S. PATENT DOCUMENTS 2,638,925  5/1953  Monahan ................... 251/DIG. 3
3,749,109  7/1973  Rosenfeld .................... 137/84 X
3,976,280  8/1976  Alexander .................. 251/DIG. 3

FOREIGN PATENT DOCUMENTS 2257831  6/1974  Fed. Rep. of Germany .... 251/DIG. 3

*Primary Examiner*—Alan Cohan
*Attorney, Agent, or Firm*—Oblon, Fisher, Spivak, McClelland & Maier

[57] ABSTRACT

A fluid control valve, especially intended as a pilot valve in pneumatic control systems, in which the controlled flow path is provided by the gaps between adjacent coils of a helical spring. The flow direction is from the outside to the inside of the spring; this allows the valve to seal against high pressures, since the spring will be helped to remain closed by the pressure forces acting thereon.

10 Claims, 2 Drawing Figures

VALVES

This invention relates to valves, and is particularly but not exclusively applicable to small pilot valves for use in pneumatic control systems.

It has already been proposed to make valves in which a helical spring controls the flow of fluid. In these previously proposed constructions, the space within the spring has formed the inflow chamber of the valve, while the space surrounding the spring has formed the outflow chamber of the valve. One end of the spring is closed, and is connected to a suitable operating mechanism, whereby the spring can be moved between an opened condition in which its coils are separated, allowing communication between the inflow and outflow chambers, and a closed condition in which adjacent coils of the spring are in contact.

With these previously-proposed constructions, the pressure inside the spring is higher than that outside, and this excess of pressure tends to move the spring to its opened condition. Consequently, such valves can only be used for low pressures, and may even then suffer from leakage problems.

For operation at higher pressures, various other forms of valve have been used. For example, one form of valve which is often used in pneumatic analog systems comprises a nozzle which is obstructed to a greater or lesser degree by a 'flapper' which moves towards or away from the nozzle, thereby varying the resistance to flow through the nozzle. However, many of these earlier forms of valve require accurate machining of sealing components of the valve, or suffer from wear while in service.

Accordingly, it is an object of the present invention to provide a valve which can be used to control high pressures, is cheap and simple to construct, and does not suffer from wear in service.

Thus, according to a first aspect, the invention provides, a valve comprising a first chamber, a second chamber, a helical spring mounted within the said first chamber, with the space within the said spring forming at least part of the second chamber of the valve, and one end of the said spring being closed, and operating means arranged to move the closed end of the spring so as to move the spring between a closed condition in which adjacent coils of the spring are in contact, and an opened condition in which at least some adjacent coils of the spring are separated, allowing flow communication between the first and second chambers. The present invention also provides inflow means leading into the first chamber, and outflow means leading out of the second chamber, whereby the pressure in the first chamber will normally exceed the pressure in the second chamber, and will tend to move the spring to its closed condition.

Where the spring is cylindrical in shape, the excess pressure in the first or inflow chamber may act on the closed end of the spring to tend to keep the spring in its closed condition. Alternative arrangements are possible; for example, the spring may taper towards its closed end, so that the excess pressure acting on the coils of the spring produces an axially-acting component of force. In either case, since the pressure in the first or inflow chamber will normally be higher than that in the second or outflow chamber, a pressure force will arise which tends to move the spring to its closed condition, and this force assists sealing between adjacent coils of the spring; for example; it is possible to design a valve which will seal against a pressure difference of 10 bars, using only a light spring. This is in contrast to arrangements in which the pressure inside the spring is higher than that outside the spring. With such arrangements, the pressure difference tends to open the valve, possibly leading to leakage problems.

Valves according to the invention are particularly well suited to applications in which the outflow chamber communicates more or less directly with the atmosphere. In this case, the operating means may comprise a plunger which extends from the closed end of the spring, through the bore of the spring and through a hole in a wall to which the end of the spring remote from the one end is connected. This arrangement removes the need for any seals between moving and stationary parts of the valve; the hole through which the plunger passes can simply have a generous clearance around the plunger, which clearance itself may constitute the communication between the outflow chamber and atmosphere.

One case in which the outflow chamber communicates directly with the atmosphere is when the valve is used in conjunction with a restrictor, to provide a pressure output signal which varies smoothly with movement of the valve operating means. The restrictor may be incorporated into the construction of the valve; thus, the valve may comprise a pressure supply connection, a restrictor leading from the pressure supply connection to the inflow chamber of the valve itself, and a pressure signal output connection which leads from the inflow chamber, while the outflow chamber of the valve communicates with atmosphere. Such an arrangement is convenient, for example, when a pressure output signal is required to operate a larger valve. One feature of this arrangement is that the change in pressure in the inflow chamber results in a change in the pressure force acting on the closed end of the spring. This gives a positive feedback effect when the valve is operated by a force (as opposed to a movement); this feedback results in increased sensitivity.

The helical spring may be arranged to operate in various ways; for example, it may be so wound that, when it is unstressed, it is in the opened condition; in this case, the operating means must apply a force to the spring to move it to the closed condition. Alternatively, the spring may be close-wound, so that it adopts the closed condition when it is not subjected to any external forces. In this case, the operating means may operate by producing bending of the spring, so that the coils separate on one side only of the spring; however, in the preferred arrangement, a close-wound spring is moved to the opened condition by a simple axial extension force.

The axial extension of the spring may be limited by arranging that the closed end of the spring abuts against the wall of the inflow chamber before excessive extension has taken place, or, preferably, by arranging than an operating plunger of the valve is fully pressed into the housing of the valve before excessive extension has taken place.

The invention also provides, according to a second aspect, a fluid pressure system including a source of fluid under pressure which communicates with the inflow chamber of a valve according to the first aspect.

Figure 2:
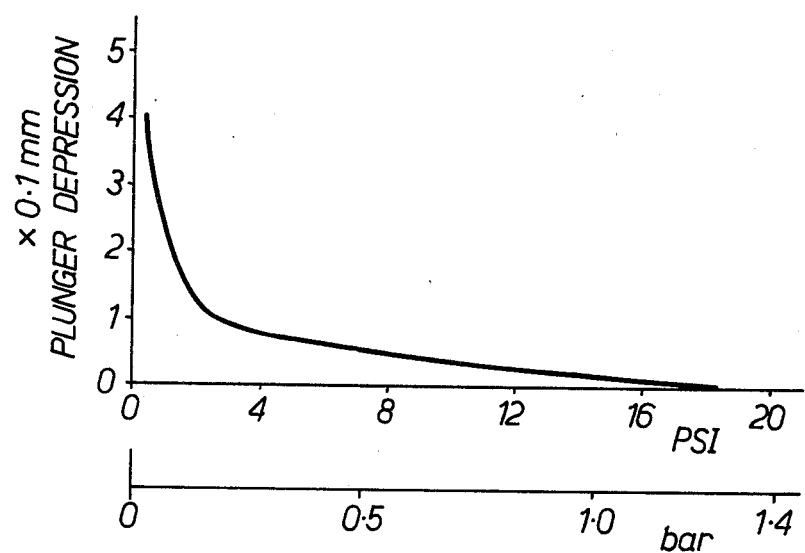

The invention may be carried into practice in various ways, but one specific example will now be described by way of example, with reference to the accompanying drawings, of which:

FIG. 1 is a section through a pneumatic pilot valve embodying the invention; and FIG. 2 is a graph showing the variation of output pressure of the valve of FIG. 1 with displacement of the operating plunger.

The main components of the valve are a valve body 10, a cover plate 12, an operating plunger 14 and a helical spring 16. The moving parts of the valve, that is to say, the operating plunger 14 and the spring 16, are mounted on the cover plate 12, forming a unit which then fits into the valve body 10.

The spring 16 is made of stainless steel wire, and is close-wound; that is to say, when it is not subjected to any external forces, adjacent coils of the spring are biased into contact with one another by the resilience of the wire. One end of the spring 16 is attached to a spigot 18 on the cover plate 12; the spigot 18 is externally screw-threaded to match the coils of the spring 16, and, additionally, the spring is bonded to the spigot by an epoxy resin adhesive. The other end of the spring 16 is attached in a similar manner to an enlarged head 20 at one end of the operating plunger 14. The rest of the operating plunger extends through the bore of the spring 16 and through an oversized hole 22 in the cover plate 12, and projects a short distance from the hole 22. The cover plate is secured to the valve body 10 by screws 24, and sealed by a sealing ring 26; the spring 16 is then housed within a cylindrical cavity 28 in the valve body, while the end of the operating plunger projecting from the hole 22 is still outside the valve body, and forms the member to which external forces are applied to operate the valve.

It will be seen that, as long as no external forces are applied to the operating plunger 14, there will be no flow path from the interior of the cavity 28, through the hole 22 to the atmosphere, because the coils of the spring remain biased into engagement with one another. However, if a force is now applied to the plunger 14, tending to push it into the body 10, the coils of the spring will separate, allowing communication between the cavity 28 and atmosphere, through the clearance between the hole 22 and the plunger 14. This communication is used to produce a variation in a pneumatic output signal, in the following manner.

The valve body 10 is provided with two pneumatic connections 30 and 32 which communicate with the interior of the cavity 28. The pressure supply connection 30 is connected to a source of compressed air, and incorporates a restrictor 34; the connection 32 constitutes the output connection of the valve. In effect, the restrictor 34 and the flow restriction formed by the limited opening (if any) between the coils of the spring 16 form a pneumatic potential divider, whose output signal is supplied through the connection 32. When no external force is applied to the plunger 14, the pressure in the cavity 18 and in the output connection 32 will rise to be very close to the supply pressure, because there is virtually no flow between the coils of the spring 16; conversely, if a sufficient force is applied to the plunger 14, the flow paths between the coils of the spring will become sufficiently large to exhibit a much lower flow resistance than does the restrictor 34, so that the output pressure of the valve will then be close to atmospheric pressure. Between these extremes there is a smooth variation of output pressure with displacement of the plunger 14; this is illustrated in FIG. 2.

It will be seen that one side of the enlarged head 20 of the plunger 14 is exposed to the output pressure of the valve. This introduces a degree of positive feedback into the valve; for example, an increase in the external force applied to the plunger 14 will tend to reduce the output pressure of the valve, and this pressure reduction will result in an additional movement of the plunger 14, reducing the output pressure somewhat further, and so on until a state of equilibrium is attained. The effect of the positive feedback is therefore to narrow the gap between the operating forces needed to produce minimum and maximum output pressures from the valve; the amount of the positive feedback is normally not sufficient to cause hysteresis in the operation of the valve.

The amount of the positive feedback can be adjusted by using restrictors 34 of different sizes. For example, by using a restrictor with a larger orifice, a given movement of the plunger 14 will have less effect on the output pressure of the valve, and so the positive feedback will be less.

It will also be seen that, provided that the plunger 14 is operated by a component which is sufficiently large to be unable to penetrate into the hole 22, the travel of the plunger 14 will be limited by engagement of this component against the cover plate 12; this arrangement ensures that the spring 16 cannot be overstretched.

What we claim as our invention and desire to secure by Letters Patent is:

1. A valve comprising:
    an inflow chamber;
    a pressure supply connection;
    a restrictor leading from the said pressure supply connection to the said inflow chamber;
    an outflow chamber in communication with the atmosphere;
    a helical spring mounted within the said inflow chamber, with the space within the said spring forming at least part of the said outflow chamber of the valve, and one end of the said spring being closed;
    a pressure signal output connection which leads out of the inflow chamber; and
    operating means adapted to move said closed end of said spring to move the said spring between a closed condition in which adjacent coils of the said spring are in contact, and an opened condition in which at least some adjacent coils of the said spring are separated, allowing communication between the inflow chamber and the said outflow chamber, and said spring being so arranged in said inflow chamber that any excess of pressure in the said inflow chamber over that in the said outflow chamber tends to move the spring to its closed condition, whereby any movement of the said spring between its said closed and opened positions is assisted by a positive feedback pressure force.

2. A valve as claimed in claim 1 in which the said spring is cylindrical in shape, and the said closed end of the spring is exposed to the pressure in the said inflow chamber.

3. A valve as claimed in claim 1 in which the said spring tapers towards its said closed end.

4. A valve as claimed in claim 1, in which the said operating means is arranged to move the said closed end of the spring in directions axial of the spring.

5. A valve as claimed in claim 4 in which the said inflow chamber has a wall positioned to limit axial movement of the said closed end of the said spring away from the said closed condition, whereby straining of the spring is prevented.

6. A valve as claimed in claim 4 which includes a wall to which is connected the end of the said spring remote from the said closed end thereof, the said wall being provided with a hole, and the said operating means comprising a plunger which extends from the said closed end of the said spring, through the bore of the said spring and through the said hole in the said wall.

7. A valve as claimed in claim 6 in which, when the said spring is in its said closed condition, the said operating plunger projects from the said wall by a distance selected to be sufficiently small to avoid straining of the said spring.

8. A fluid pressure system including a source of fluid under pressure, and at least one valve as claimed in claim 1, in which system the said pressure supply connection means is connected to the said fluid source.

9. A system as claimed in claim 8 in which the said fluid is air.

10. The valve of claim 1 wherein the coils of said helical spring are composed of uncoated metal.

* * * * *